United States Patent [19]

Millette et al.

[11] 4,448,331

[45] May 15, 1984

[54] DISPENSER FOR DISPENSING VARIABLE AMOUNTS OF A GRANULAR MATERIAL

[75] Inventors: Germain Millette; Michel Martin, both of Longueuil, Canada

[73] Assignee: Distributeur Minute Inc., Longueuil, Canada

[21] Appl. No.: 380,279

[22] Filed: May 20, 1982

[30] Foreign Application Priority Data

Oct. 15, 1981 [CA] Canada .................................. 388001

[51] Int. Cl.$^3$ .......................... B67D 5/06; G01F 11/10
[52] U.S. Cl. .................................... 222/181; 222/284; 222/305; 222/339; 222/363
[58] Field of Search .............. 222/181, 185, 264, 266, 222/277, 278, 291, 284, 288, 305, 339, 363, 368; 221/266; 141/360–363

[56] References Cited

U.S. PATENT DOCUMENTS

| | | |
|---|---|---|
| 1,270,937 | 7/1918 | Gibbons . |
| 1,378,377 | 5/1921 | Heathcote . |
| 1,430,876 | 10/1922 | Apfel . |
| 1,462,954 | 7/1923 | Burnett . |
| 1,607,235 | 11/1926 | Brundage . |
| 1,724,751 | 8/1929 | Cushing . |
| 1,939,939 | 12/1933 | Worrell . |
| 2,130,941 | 9/1938 | Belveal . |
| 2,532,698 | 12/1950 | Corkins . |
| 2,655,291 | 10/1953 | Roundtree .......................... 222/266 |
| 2,785,831 | 3/1951 | Smolin ................................ 222/305 |
| 2,920,796 | 1/1960 | Field . |
| 3,113,655 | 12/1963 | Adler . |
| 3,445,040 | 5/1969 | Katz . |
| 3,911,582 | 10/1975 | Rohm et al. . |
| 4,066,186 | 10/1976 | Agey . |
| 4,158,374 | 6/1979 | Ciuffelti ............................. 222/288 |

*Primary Examiner*—H. Grant Skaggs
*Attorney, Agent, or Firm*—Robic, Robic & Associates

[57] ABSTRACT

A dispenser of a granular material having a hopper containing the product and, at the base of the hopper, a device for measuring and distributing the product as well as a support to hold the device in elevated position. The device comprises a hollow cylinder and a drum rotatably mounted in the cylinder, the drum being provided with a first and a second cavity defining, at the periphery, two openings disposed side by side and extending transversely of the drum, the opening of the first cavity extending forwardly past the opening of the second cavity in one of the directions of rotation of the drum. Two feed apertures are provided side by side through the drum cylinder and in communication with the inside of the hopper, the cavities being arranged so that their openings be, in feeding position, simultaneously in registry with the feed aperture. Two dispensing apertures are provided side by side through the drum cylinder and are arranged so as to communicate successively with the drum cavities in dispensing position for discharging the product fed in the cavities. The spacing between the feed apertures and the dispensing apertures, about the drum, is calculated to allow selective communication of the cavities either with the feed apertures or with the dispensing apertures. Finally, a mechanism is provided to allow controlled rotation, in two steps, of the drum so that, in a first step, only the opening of the first cavity is brought into registry with the dispensing aperture corresponding to it and, in a second step and following further rotation of the drum, the opening of the second cavity is brought into registry with the corresponding dispensing aperture.

11 Claims, 5 Drawing Figures

DISPENSER FOR DISPENSING VARIABLE AMOUNTS OF A GRANULAR MATERIAL

The present invention relates to a dispenser for dispensing a product in predetermined quantities. It particularly relates to a dispenser adapted to distribute granular products, such as sugar, coffee, chocolate or other products of similar nature hereinafter called granular products.

The dispenser according to the present invention is of the general type which essentially comprises a hopper adapted to contain a reserve of the product to be distributed and provided, at its base, with a device for dispensing the product in predetermined quantities. The hopper and the device are mounted or are made integral with a support which elevates them to allow the insertion of a container, such as a drinking cup, beneath the device for the container to receive a predetermined quantity of the product.

We are well aware that a great variety of such dispensers are known, a prior art search having confirmed it, but we know of none that is capable of distributing a granular product not only in one single predetermined quantity but, according to one's choice, in two different predetermined quantities without it being necessary to bring about any physical changes to the apparatus to obtain either one of the two predetermined quantities or doses.

It is consequently a first object of the present invention to provide a dispenser capable, in a first step, to supply a predetermined quantity of the product and, if desired and following further operation of the device, obtain an additional quantity of the product to give a more important dose. In other words, for instance, if the dispenser is for distributing coffee, one could obtain a minimal predetermined quantity or dose in a first step and, if desired, increase this predetermined quantity by further actuating the machine in the manner described hereinafter.

The invention is also directed towards a dispenser of the above type which is of simple construction, can be produced esthetically because of its simplicity and the fact that it can be made of plastic material and which can be mounted and dismounted easily while having components of simple shape that can easily be cleaned, which is important since the dispenser is usually intended for the distribution of food products. This simplicity in shape, resulting from a very elementary mechanism, will allow the apparatus to be manufactured at a relatively low cost.

The above objects are obtained, according to the invention as herein broadly claimed, in a dispenser of the aforesaid type wherein the measuring and distributing device essentially comprises: a hollow cylinder and a rotary drum mounted therein, the drum having a first and a second cavity defining, at the periphery of the drum, two openings disposed side by side in a direction parallel to the axis of the drum and extending transversely of the said axis, the opening of the first cavity extending forwardly past the opening of the second cavity in one of the two directions of rotation of the drum; two feed apertures, provided side by side through the drum cylinder and in communication with the inside of the hopper; the said cavities being arranged so that their openings be, in feeding position, simultaneously in registry with the feed apertures; two dispensing apertures, provided side by side through the drum cylinder and arranged so as to communicate successively with the said drum cavities in dispensing position for discharging the product fed into the cavities; wherein the spacing between the feed apertures and the dispensing apertures, about the drum, is provided to allow selective communication of the cavities either with the feed apertures or with the dispensing apertures, and means to allow controlled rotation, in two steps, of the drum in the said one of the two directions of rotation from the said feed position of the cavities: in a first step, when only the opening of the first cavity is brought into registry with the dispensing aperture corresponding thereto and, in a second step and following further rotation of the drum, when the opening of the second cavity is brought into registry with the corresponding dispensing aperture thereof.

Thus, in a first rotating step of the drum, only the quantity of the product which is in the first cavity is obtained. If the rotation producing means are further actuated, an additional quantity of the product is obtained which is that in the second cavity.

According to a particular and preferential embodiment of the invention, the controlled rotation means comprise: a device to drive the drum into rotation including means to stop its rotation when the second cavity stands in registry with its dispensing aperture; a stop device, provided simultaneously on the cylinder and on the drum, to stop rotation of the drum when the first cavity is in registry with its dispensing aperture, this stop device being releasable to allow the said further rotation of the drum causing registry of the second cavity with its dispensing aperture, and resilient means adapted to cause reverse rotation of the drum to bring it back to the said feeding position of the cavities.

The device to drive the drum into rotation could be, for instance, a rack mechanism made up of a series of holes provided about the periphery of the drum successively coming, during rotation of the drum, in facing relation with an orifice of the cylinder; a slider mounted beneath the cylinder and in which an actuating arm slides of which a surface is provided with upstanding teeth adapted to engage successively, during sliding of the said arm, into the said holes to cause rotation of the drum, and a control lever extending laterally of the arm on which the container, adapted to receive a predetermined amount of granular product, presses to cause sliding of the arm and rotation of the drum from the said feed position to the said dispensing positions of the cavities.

Further objects and other advantages of the invention will be afforded by the description that follows of a preferred embodiment of the invention having reference to the appended drawings wherein.

Figure 1:
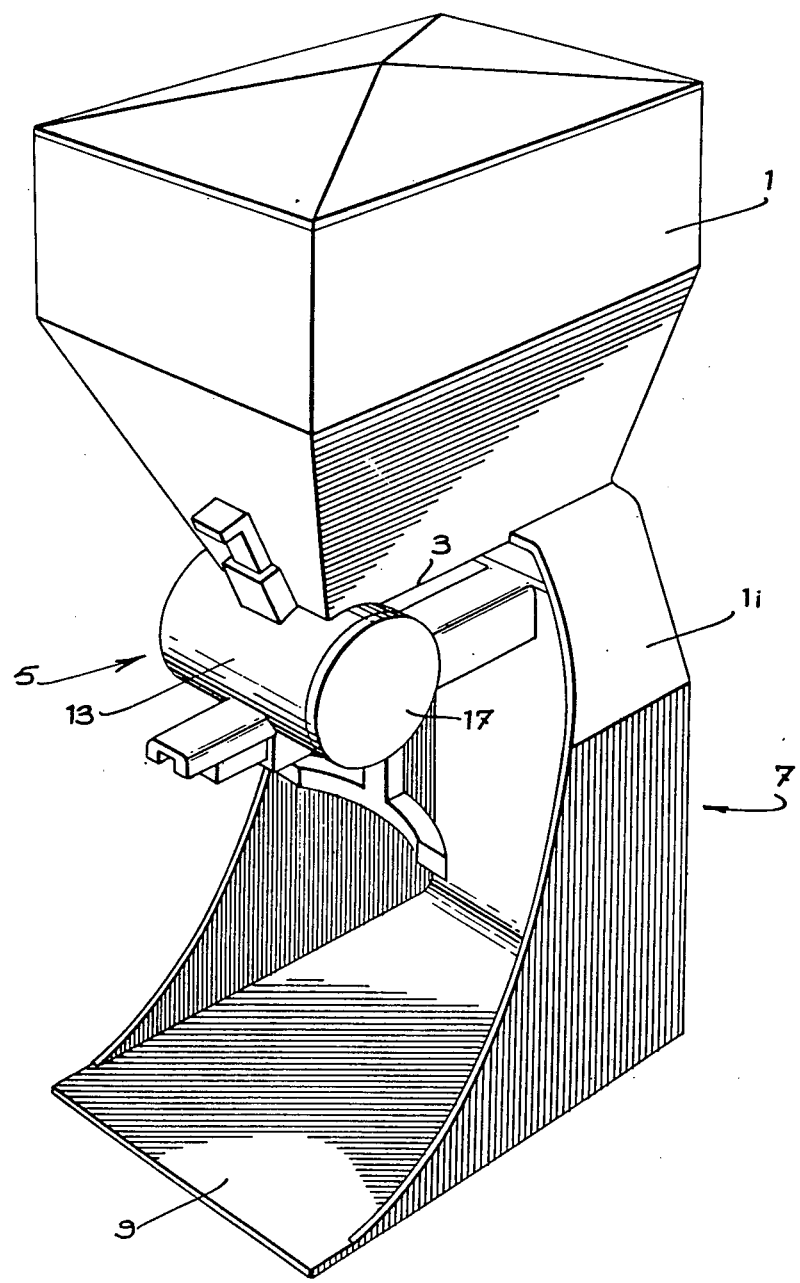
FIG. 1 is a view in perspective of a dispenser including a device for measuring and distributing a granular product, device made according to the teaching of the present invention.

Referring now to the drawing, particularly to FIG. 1, the distributor is of the type comprising a hopper 1 adapted to contain a reserve of the product to be distributed and provided at its base 3 with a device 5 for measuring and distributing the product. The hopper 1 and the device 5 are mounted on a support 7 including a foot 9 and a vertical support 11 having three walls of which the upper edges are secured, or made integral with in any known manner, the base 3 of the hopper 1. This support 11 forms an inner chamber in which is partially located the device 5 in such a way that a container, such as a drinking cup, may be lodged to receive a predetermined quantity of the product, as will be described in further detail hereinafter.

Figure 5:
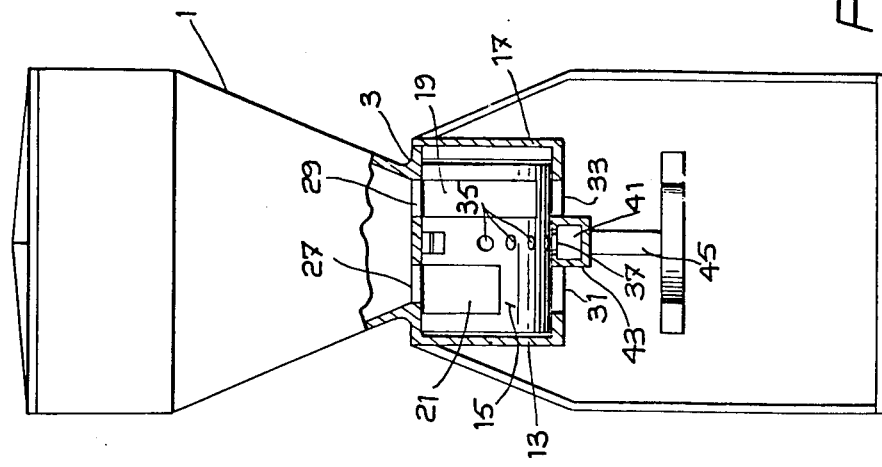
FIG. 5 is a vertical cross-section generally along a plane passing through line V—V of FIG. 4.

The quantity control and distributing device 5 comprises a hollow cylinder 13 forming an integral part with the hopper 1, at its base, and in which a drum 15 is rotatably mounted, the cylinder 13 being thereafter closed by means of a cap 17 which may for instance be threaded through the end of the cylinder serving to insert the drum 15 (FIG. 5).

Figure 2:
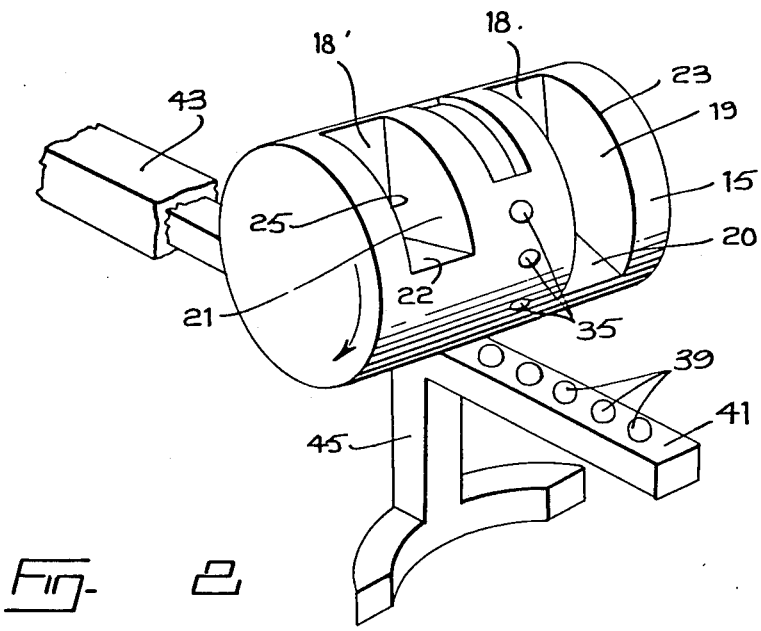
FIG. 2 is a view in perspective of a the measuring and distributing drum as well as its rotation producing means.

As better seen in FIG. 2, the drum 15 is provided with a first cavity 19 and with a second cavity 21, the cavity 19 defining at the periphery of the drum 15 an opening 23 of arcuate rectangular shape whereas the cavity 21 defines the opening 25, also rectangular and arcuate. The openings 23 and 25 are thus located side by side with respect to the direction of the axis of the drum 15 and extend transversely relative to the same axis. It is important to note that the opening 23 of the cavity 19 extends appreciably ahead of the opening 25 of the cavity 21 for a purpose to be specified hereinafter.

The product in the hopper 1 is discharged into the cavities 19 and 21 by means of two feed apertures 27, 29 (FIG. 5) provided side by side through the cylinder 13, these apertures 27, 29 communicating directly with the inside of the hopper 1 and the cavities 19, 21 are disposed in such a manner that their opening 23, 25 be, in feeding position, simultaneously beneath the feed apertures 27, 29. For this reason, it is preferable that the cavities 19, 21 terminate together at their ends opposite those where the first cavity 19 stands ahead of the second cavity 21, as clearly illustrated in FIG. 2, the forward extension of the cavity 19 being taken with respect to the direction of rotation indicated by the arrow. In the case illustrated here by way of example, the cavities 19 and 21 define an identical volume, the cavity 19 then having a length greater than that of the cavity 21. It is however possible to foresee different volume ratios between the two cavities provided that the cavity 19 stands ahead of the cavity 21 in the direction aforesaid of the drum 3 indicated by the arrow in FIG. 2 and which is the direction of distribution of the product.

The product in the cavities 19 and 21 is discharged in the aforesaid container by means of two dispensing apertures 31, 33 standing side by side and extending also through the cylinder 13 and arranged in such a manner as to successively communicate with the cavities 19, 21 when the latter are in the dispensing positions of the product.

It is important to note here that the spacing between the feed apertures 27, 29 and the dispensing apertures 31, 33, about the cylinder 13, must be such as to allow a selective communication of the cavities 19, 21 either with the feed apertures 27, 29, or with the dispensing apertures 31, 33. In other words, it is not possible simultaneously to have feeding of the product into the cavities 19 and 21, through apertures 27 and 29, and dispensing of the product in the cavities 19, 21 through the dispensing apertures 31, 33. Thus, there is obtained an exact quantity control.

As has been mentioned above, there is provided means to allow controlled rotation, in two steps, of the drum 15 in the direction of rotation indicated by the arrow in FIG. 2 starting with the feed position of the cavities. Thus, in a first step, this rotation means brings the opening 23 of the cavity 19 in registry with its dispensing aperture 33. In a second step, and following further rotation of the drum 15 always in the same direction of rotation indicated by the arrow of FIG. 2, the aforesaid rotation producing means bring the opening 25 of the second cavity 21 in registry with its dispensing aperture 31 to allow emptying of the cavity 21.

Figure 4:
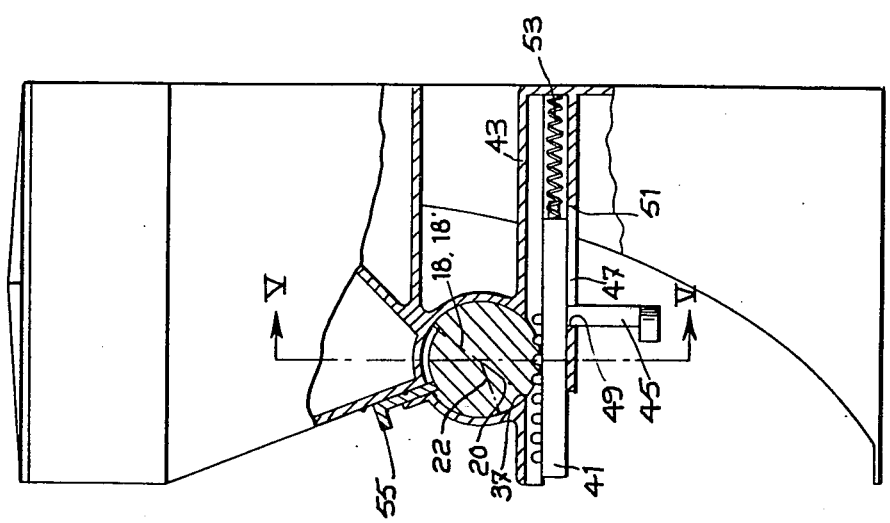
FIG. 4 is a side elevation view of the dispenser, partially broken away to illustrate the measuring and distributing device.

The illustrated means for the controlled rotation of the drum 15 comprises a device capable of rotating the drum 15, this device including means to stop the rotation when the cavity 21 stands in registry with its dispensing aperture 31. More specifically, the device is a rack mechanism made up of a series of holes 35 (FIGS. 2 and 5) evenly distributed about the periphery of the drum 15 and successively coming, during the rotation, in facing relation with an orifice 37 (FIGS. 4 and 5) provided at the base of the cylinder 13 and between the dispensing apertures 31 and 33. These holes 35 cooperate with hemispherical teeth 39 upstanding from one face of an actuating arm 41 sliding in a slider 43 secured to the base of the cylinder 13, transversely thereof, as best illustrated in FIG. 4. It will thus be easily understood that axial displacement of the actuating arm 41 brings the hemispherical teeth 39 in mesh with the holes 35 of the drum to rotate the latter. The means to allow rotation of the drum 15 finally comprises a control lever 45 extending laterally of the actuating arm 41 and movable in a rectilinear slot 47 extending through the base of the slider 43 and of which the ends constitute stops 49 and 51 for the said lever 45. In the position of the measuring and distributing device such as illustrated in FIG. 4, the control lever 45 bears against the stop 49 by means of the bias applied by a return spring 53 and, in that position, the forward faces 20 and 22 (FIGS. 2 and 4) of the cavities 19 and 21 stand short of the start of the dispensing apertures 31, 33 and the product contained in the cavities 19 and 21 is held in the drum 15. It is also to be noted that the rearward faces 18, 18' of the cavities 19 and 21 (which lie in the same plane) are located at one end of the feed apertures 27 and 29, allowing the product in the hopper 1 to be discharged into the cavities 19 and 21. It is only when the faces 18, 18' have reached the other end of the feed apertures 27 and 29 that the face 20 of the cavity 19 will start to move over its dispensing aperture 33.

From the above description, it will be understood that if a container intended to receive the granular product is located beneath the measuring and distributing device and pushes on the control lever 45, in the direction indicated by the arrow in FIG. 4, until the lever 45 reaches the stop 51, the two cavities 19 and 21 will then have been successively placed in registry with the dispensing apertures 31, 33 of the cylinder 13 and the product of the two cavities will have been emptied into the container.

As has been mentioned previously, a stop device is provided allowing the user to obtain, if he so wishes, only the predetermined quantity contained in the cavity 19.

Figure 3:
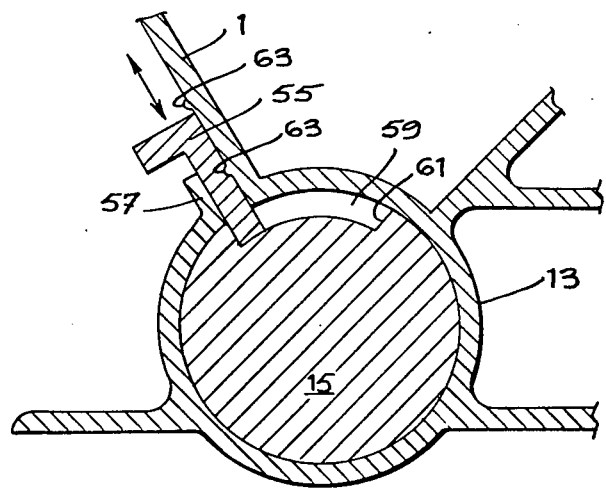
FIG. 3 is a vertical partial cross-sectional view of the measuring and distributing device.

This stop device is made up of a detent 55, having the general shape of an inverted L, freely displaceable in a slider 57 formed by the body of the cylinder 13 and one face of the hopper 1, this slider providing access to the inside of the cylinder and more particularly to a groove 59 (FIG. 3) provided at the periphery of the drum 15. The location of the groove 59 on the drum is such that one of its ends 61 comes to butt against the detent 55 to stop rotation of the drum 15 before the face 22 of the second cavity 21 reaches the beginning of its dispensing aperture 31. It will however be understood that, at that time, the cavity 19 will have already reached and be placed in registry with its dispensing aperture 33 so that its predetermined quantity of product will have been discharged into the container.

If, on the other hand, the detent 55 is completely pulled out of the groove 57, it will thus be possible to move the actuating arm 41 further, against the bias of the spring 53, in such a manner that it will then be possible to bring the cavity 21 in facing relation with its dispensing aperture 31 to allow the predetermined quantity of product that it contains to be discharged into the container, the lever 45 stopping when it hits the stop 51.

If the actuating arm 41 is thereafter released, it will move in reverse direction under the bias of the spring 53 until the control lever 45 bears against the stop 49 when the two cavities 19 and 21 are again in registry with their respective feed apertures 27 and 29 and receive a new quantity of product from the hopper 1.

Releasable means may also be provided to hold the detent 55 either in the groove 59 or outside of it. Such means may take the form of teats 63 (FIGS. 3 and 4) spaced from one another and provided on one face of the hopper 1, along which the detent slides, and a cup is provided on the face of the detent which bears against the aforesaid face of the hopper. The spacing between the teats 63 is obviously calculated so that they successively move into the said cup respectively in engaged position of the detent 55 in the groove 59 and in released position therefrom.

We claim:

1. A dispenser, for dispensing predetermined amounts of a granular product, essentially comprising a hopper to hold a reserve of such a product and having, at its base, a device for measuring and distributing the product and further provided with a support to hold the hopper and the device in elevated position to allow the insertion of a container beneath the device to receive therefrom a predetermined quantity of the product, the said measuring and distributing device comprising:
    a hollow cylinder and a rotary drum mounted therein, the drum having a first and a second cavity defining, at the periphery of the drum, two openings disposed side by side in a direction parallel to the axis of the drum and extending transversely of the said axis, the opening of the first cavity extending forwardly past the opening of the second cavity in one of the two directions of rotation of the drum;
    two feed apertures, provided side by side through the drum cylinder and in communication with the inside of the hopper; the said cavities being arranged so that their openings be, in feeding position, simultaneously in registry with the feed apertures;
    two dispensing apertures, provided side by side through the drum cylinder and arranged so as to communicate successively with the said drum cavities in dispensing position for discharging the product fed into the cavities;
    wherein the spacing between the feed apertures and the dispensing apertures, about the drum, is provided to allow selective communication of the cavities either with the feed apertures or with the dispensing apertures, and
    means to allow controlled rotation, in two steps, of the drum in the said one of the two directions of rotation from the said feed position of the cavities: in a first step, when only the opening of the first cavity is brought into registry with the dispensing aperture corresponding thereto and, in a second step and following further rotation of the drum, when the opening of the second cavity is brought into registry with the corresponding dispensing aperture thereof.

2. A dispenser according to claim 1, wherein said controlled rotation means comprise:
    a device to drive the drum into rotation including means to stop its rotation when the second cavity stands in registry with its dispensing aperture;
    a stop device, provided simultaneously on the cylinder and on the drum, to stop rotation of the drum when the first cavity is in registry with its dispensing aperture, this stop device being releasable to allow the said further rotation of the drum causing registry of the second cavity with its dispensing aperture, and
    resilient means adapted to cause reverse rotation of the drum to bring it back to the said feeding position of the cavities.

3. A dispenser according to claims 1 or 2, wherein the cavities terminate together at the ends thereof opposite those where the first cavity is ahead of the second.

4. A dispenser according to claims 1 or 2, wherein the two cavities define identical volumes.

5. A dispenser according to claim 2, wherein the device to drive the drum into rotation is a rack mechanism made up of
    a series of holes provided about the periphery of the drum successively coming, during rotation of the drum, in facing relation with an orifice of the cylinder;
    a slider mounted beneath the cylinder and in which an actuating arm slides of which a surface is provided with upstanding teeth adapted to engage successively, during sliding of the said arm, into the said holes to cause rotation of the drum, and
    a control lever extending laterally of the arm on which the container, adapted to receive a predetermined amount of granular product, presses to cause sliding of the arm and rotation of the drum from the said feed position to the said dispensing positions of the cavities.

6. A dispenser according to claim 5, wherein the holes of the drum are provided between the cavities and the cylinder orifice is located between the dispensing apertures.

7. A dispenser according to claim 5, wherein the said control arm moves through and along a slot of the slider and the said means for stopping rotation of the drum when the second cavity faces its dispensing aperture is constituted by the end of the said slot away from the drum.

8. A dispenser according to claim 7, wherein the resilient means is a spring located in the slider and of which one end is stationary and the other bears against the end of the control arm away from the drum.

9. A dispenser according to claim 2, wherein the stop device is made up of a detent slidably displaceable through an orifice of the drum cylinder and capable of engaging into a groove at the surface of the drum, the groove extending along the periphery of the drum and having one end cooperating by abutment with the detent to stop rotation of the drum before the opening of the second cavity comes in registry with its dispensing aperture, the detent being releasable from the groove to allow further rotation of the drum during the aforesaid second step, and releasable means holding the detent in or out of the groove.

10. A dispenser according to claim 8, wherein the stop device is made up of a detent slidably displaceable through an orifice of the drum cylinder and capable of engaging into a groove at the surface of the drum, the groove extending along the periphery of the drum and having one end cooperating by abutment with the detent to stop rotation of the drum before the opening of the second cavity comes in registry with its dispensing aperture, the detent being releasable from the groove to allow further rotation of the drum during the aforesaid second step, and releasable means holding the detent in or out of the groove.

11. A dispenser according to claims 9 or 10, wherein the releasable means comprise teats spaced from one another along one face of the hopper over which the detent slides and a cup provided on the face of the detent bearing on the said hopper face, the spacing being such that they successively move into the cup in positions of the detent respectively in and out of the drum groove.

* * * * *